US011311141B2

(12) United States Patent
Dees et al.

(10) Patent No.: US 11,311,141 B2
(45) Date of Patent: Apr. 26, 2022

(54) ASSEMBLY AND METHOD FOR FROTHING FLUID

(71) Applicant: Koninklijke Douwe Egberts B.V., Utrecht (NL)

(72) Inventors: Hendrik Johan Dees, Utrecht (NL); Abram Christiaan Knip, Nieuw-Vennep (NL); Jacobus Petrus Maria Dessing, Nieuw-Vennep (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 109 days.

(21) Appl. No.: 16/122,756

(22) Filed: Sep. 5, 2018

(65) Prior Publication Data
US 2019/0069713 A1 Mar. 7, 2019

Related U.S. Application Data

(63) Continuation of application No. PCT/NL2017/050146, filed on Mar. 9, 2017.

(30) Foreign Application Priority Data

Mar. 9, 2016 (NL) ..................................... 2016403

(51) Int. Cl.
*A47J 31/60* (2006.01)
*A47J 31/44* (2006.01)
(Continued)

(52) U.S. Cl.
CPC ........... *A47J 31/60* (2013.01); *A47J 31/4485* (2013.01); *A47J 31/52* (2013.01); *F25D 11/00* (2013.01); *F25D 31/002* (2013.01)

(58) Field of Classification Search
CPC .... A47J 31/60; A47J 31/4485; A47J 31/4489; A47J 31/4496; A47J 31/46; A47J 31/461;
(Continued)

(56) References Cited

U.S. PATENT DOCUMENTS

| 10,898,024 B2 | 1/2021 | Dees |
| 2004/0107843 A1 | 6/2004 | Renzo |

(Continued)

FOREIGN PATENT DOCUMENTS

| CN | 1437455 | 8/2003 |
| CN | 1682586 | 10/2005 |

(Continued)

OTHER PUBLICATIONS

87. Ferro Techniek's "FTH mk2" website, available at http://www.ferrotechniek.com/thick_film_heaters/products/fth_mk2.aspx (Dec. 6, 2015, retrieved on web.archive.org) (Year: 2015).*

(Continued)

*Primary Examiner* — Mikhail Kornakov
*Assistant Examiner* — Richard Z. Zhang
(74) *Attorney, Agent, or Firm* — Fitch, Even, Tabin & Flannery LLP

(57) ABSTRACT

An assembly for frothing a fluid having an air channel with a controllable air valve and having a fluid channel with an air inlet emanation point in which the air channel emanates, a pump, a fluid restriction, a heater, and a valve assembly having a first state in which fluid is channeled to a fluid outlet of the fluid channel and a second state in which the fluid is diverted from the fluid channel to a second fluid outlet. A water supply channel is connected to the fluid channel. The assembly also includes a cleaning reservoir and a return channel that is connected to the second fluid outlet of the valve assembly and that emanates in the cleaning reservoir. An electronic controller assembly is configured to control at least the pump, the heater, and the valve assembly, and to operate the assembly in a production mode and a cleaning mode.

30 Claims, 6 Drawing Sheets

(51) Int. Cl.
*A47J 31/52* (2006.01)
*F25D 11/00* (2006.01)
*F25D 31/00* (2006.01)

(58) Field of Classification Search
CPC ....... A47J 31/469; A47J 31/50; F25D 31/002; F25D 31/005; F25D 2331/8051; F25D 2400/02; F25D 11/00–04; B08B 9/00–46
See application file for complete search history.

(56) References Cited

U.S. PATENT DOCUMENTS

| | | | |
|---|---|---|---|
| 2004/0118291 A1 | 6/2004 | Carhuff et al. | |
| 2005/0233043 A1 | 10/2005 | Dirren | |
| 2006/0045942 A1 | 3/2006 | Sher | |
| 2006/0175351 A1* | 8/2006 | Reddy | A47J 31/60 222/145.5 |
| 2008/0093382 A1 | 4/2008 | Sher | |
| 2009/0011110 A1 | 1/2009 | Gotlenboth | |
| 2009/0038655 A1* | 2/2009 | Coccia | A47J 31/60 134/115 R |
| 2009/0183754 A1 | 7/2009 | Heinz | |
| 2009/0293733 A1 | 12/2009 | Scott | |
| 2010/0047406 A1* | 2/2010 | Reyhanloo | B01F 3/04808 426/231 |
| 2010/0075007 A1* | 3/2010 | Schindler | A47J 31/4485 426/474 |
| 2010/0147158 A1 | 6/2010 | Muller | |
| 2011/0049187 A1* | 3/2011 | Boekhoorn | A47J 31/402 222/148 |
| 2011/0070349 A1 | 3/2011 | Adrian | |
| 2011/0083561 A1* | 4/2011 | Douma | A47J 31/4485 99/323.1 |
| 2011/0094541 A1* | 4/2011 | Douma | A47J 31/469 134/22.11 |
| 2011/0192287 A1 | 8/2011 | Wolfgang | |
| 2011/0232501 A1 | 9/2011 | Kroesen | |
| 2011/0256289 A1 | 10/2011 | Adrian | |
| 2013/0032036 A1 | 2/2013 | Zhong | |
| 2013/0075939 A1 | 3/2013 | Noordhuisjoeke | |
| 2013/0145936 A1 | 6/2013 | Dollner | |
| 2013/0209639 A1 | 8/2013 | Larson | |
| 2013/0276636 A1* | 10/2013 | Rithener | A47J 31/4403 99/285 |
| 2015/0150408 A1 | 6/2015 | Schlee | |
| 2015/0223633 A1 | 8/2015 | Stutz | |
| 2015/0245735 A1 | 9/2015 | Stutz | |
| 2016/0051083 A1* | 2/2016 | Turi | B01F 3/04808 426/474 |
| 2018/0084940 A1 | 3/2018 | White | |
| 2019/0069713 A1 | 3/2019 | Dees | |
| 2019/0365144 A1 | 12/2019 | Upston | |

FOREIGN PATENT DOCUMENTS

| | | |
|---|---|---|
| CN | 101048096 | 10/2007 |
| CN | 101059267 | 10/2007 |
| CN | 101128142 | 2/2008 |
| CN | 102144892 | 8/2011 |
| CN | 202198441 | 4/2012 |
| CN | 102946774 | 2/2013 |
| CN | 204483851 | 7/2015 |
| CN | 204950593 | 1/2016 |
| CN | 205018844 | 2/2016 |
| DE | 20 2009 007 945 | 10/2009 |
| DE | 20 2009 007 946 | 10/2009 |
| DE | 102010010516 A1 | 9/2011 |
| EP | 0 485 320 | 5/1992 |
| EP | 0 485 350 | 5/1992 |
| EP | 0997093 | 5/2000 |
| EP | 2 120 656 | 11/2009 |
| EP | 2534986 | 12/2012 |
| EP | 2987435 | 2/2016 |
| JP | 2013116215 | 6/2013 |
| WO | 2008120991 | 10/2008 |
| WO | 2008139205 | 11/2008 |
| WO | WO-2010/044116 | 4/2010 |
| WO | 2012083194 | 6/2012 |
| WO | 2013012882 | 1/2013 |
| WO | 2013078379 | 5/2013 |
| WO | 2017155401 | 9/2017 |
| WO | WO-2017/155400 | 9/2017 |

OTHER PUBLICATIONS

International Search Report and Written Opinion, PCT/NL2017/050146, Koninklijke Douwe Egberts B.V., 10 pages dated (Jun. 28, 2017).
Chinese office action dated Apr. 27, 2020 for Chinese Application No. 201780012724.X (3 pgs.).
International Search Report and Written Opinion dated Feb. 14, 2020, International Application No. PCT/NL2019/050849 (12 pgs.).
International Search Report and Written Opinion dated Jun. 30, 2017, International Application No. PCT/NL2017/050147 (8 pgs.).
Search Report dated Apr. 17, 2020 for Chinese Application No. 201780012724.X (2 pgs.).

* cited by examiner

ASSEMBLY AND METHOD FOR FROTHING FLUID

CROSS-REFERENCE TO RELATED APPLICATIONS

This application is a continuation of PCT/NL2017/050146, filed Mar. 9, 2017, which claims the benefit of and priority to Netherlands Application No. 2016403, filed Mar. 9, 2016, the entire contents of all of which are hereby incorporated herein by reference.

BACKGROUND

Devices for frothing liquids, such as milk, are well-known in the art, for example from EP 0.485.350 A1 or EP 2.120.656 B1. EP 0.485.350 A1 discloses a device for homogenizing, mixing and emulsifying liquid products, such as milk. The device comprises a container and a pump that are connected by an inlet conduit. The device additionally comprises an air inlet valve that emanates in the inlet conduit. The pump is connected to an outlet conduit that emanates in a jet breaker spout. The outlet conduit is provided with a heating element. In use, an amount of liquid from the container and a predetermined amount of air from the air inlet are provided to form an air/liquid-mixture that is supplied to the pump. In the pump the air/liquid-mixture is frothed by mechanical whipping. When required by the user, the frothed liquid is heated using the heating element. To clean the known device, partial disassembly of the known device is necessary.

EP 2.120.656 B1 discloses a device for the production of milk foam or milk-based drinks. The device comprises a container and a pump that are connected by a milk conduit. The device also comprises an air conduit with an air inlet and an air outlet, the latter of which emanates in the milk conduit. The pump is connected to a restriction for frothing the milk/air-mixture that is provided to the restriction by the pump. Downstream of the restriction a valve assembly is installed in the milk conduit. In a first state of the valve assembly, the frothed milk is delivered to and dispensed from the milk conduit via a milk outlet. In the second state of the valve assembly, the frothed milk is led through a parallel milk conduit that includes a heater to heat the frothed milk before it is delivered and dispensed from the outlet. In order to clean the device, the milk conduits are flushed using a cleaning agent and/or water and/or a mixture of a cleaning agent with water. The cleaning agent and/or water are dispensed from the milk outlet and are collected in a separate container.

A disadvantage of the device of EP 0.485.350 A1 is that the cleaning process requires a significant amount of time and effort. In order to clean the device, at least partial disassembly of the device is required. This for example includes the removal of the heating element from the fluid outlet or disassembly of the heater. Such partial disassembly takes considerable amount of time and effort that increases the downtime of the device.

Although the device of EP 2.120.656 B1 does not require (partial) disassembly, the cleaning process still requires a significant amount of time, a relatively high amount of water and/or cleaning agent and the presence of a skilled operator.

SUMMARY

The invention is aimed at providing an assembly for frothing fluids that can be cleaned more easily. To that end, the invention provides an assembly for frothing a fluid including:

a controllable air source assembly including an air channel having an air inlet and a downstream end;
a fluid channel extending from a fluid inlet to a fluid outlet, the fluid channel including subsequently:
an air inlet emanation point to which the downstream end of the air channel is connected;
a pump;
a fluid restriction;
a heater;
a valve assembly having a first state in which fluid is channeled to the fluid outlet of the fluid channel and a second state in which the fluid is diverted from the fluid channel to a second fluid outlet of the valve assembly;
a water supply channel connected to the fluid channel and including a controllable water valve;
a cleaning reservoir;
a return channel having an upstream end that is connected to the second fluid outlet of the valve assembly and having a downstream end that emanates in the cleaning reservoir;
an electronic controller assembly configured to control at least the pump, the heater, and the valve assembly, wherein the electronic controller assembly is configured to operate the assembly in a production mode and in a cleaning mode;
wherein, in the production mode, the fluid inlet of the fluid channel is supplied with fluid to be frothed and wherein, during at least part of the cleaning mode, the fluid inlet of the fluid channel is supplied with cleaning fluid.

The assembly for frothing a fluid according to the invention has the advantage that is integrally provided with the components that are needed to clean the assembly. In the cleaning mode, that is during cleaning operation, the fluid inlet is supplied with cleaning agent, for example by connecting the fluid inlet to or inserting the fluid inlet in the cleaning reservoir so that cleaning fluid can be extracted from the cleaning reservoir. Subsequently, the cleaning fluid may be circulated through the assembly by virtue of the valve assembly being in a second state, in which the cleaning fluid is returned to the cleaning reservoir. This provides the assembly with several advantages over the prior art devices.

First of all, only a relatively limited amount of water and/or cleaning fluid is required for the cleaning process. In prior art devices the cleaning fluid was dispensed through the fluid outlet from the assembly after only a single use. Therefore, a cleaning process having multiple cleaning steps required multiple amounts of cleaning fluid. The assembly according to the invention makes optimal use of the cleaning fluid.

Secondly, the entire fluid channel including the fluid inlet is cleaned during the cleaning mode of the assembly according to the invention.

Thirdly, by the integration of cleaning components in the assembly, the cleaning process is almost fully automated. In prior art devices, each cleaning step requires that the user or operator has to feed and collect cleaning fluid. With the assembly according to the invention, the cleaning mode can be started by establishing a fluid connection between the fluid inlet and the cleaning reservoir. In an embodiment, this can be effected by inserting the fluid inlet into the cleaning reservoir. After establishment of such a connection, the cleaning process can take place automatically without any further action being needed of the user or operator interference. Optionally, the user may insert a cleaning tablet in the cleaning reservoir. Cleaning the assembly according to the invention is easier than executing a cleaning process in prior art devices and requires less cleaning fluid and less time.

Additionally, the involvement of a user or an operator in the cleaning process is minimized relative to the prior art devices.

Thus, the downtime of an assembly may be reduced, leading to higher availability for users of the assembly.

It should be noted that the controllable water valve does not have to be a continuously variable controllable water valve but may very well also include an simple two-state water valve having an open and a closed state, wherein the electronic controller is configured to operate the water valve to bring it in the open and in the closed state. In embodiment, the cleaning fluid that is supplied to the fluid inlet of the fluid channel may be taken from the cleaning reservoir. To that end, the fluid inlet may be disconnected or removed from the fluid source containing the fluid to be frothed and be connected to or positioned in the cleaning reservoir.

The invention also provides a refrigerator including:
- a housing bounding a refrigerator space, the housing including a door that has an open position in which the refrigerator space is accessible via a door opening and a closed position for closing off the door opening; and
- the assembly for frothing a fluid according to the invention, wherein the major components of the assembly for frothing a fluid, including at least the pump, the fluid restriction, the heater, the valve assembly, the cleaning reservoir and the return channel, are positioned in the refrigerator space.

A refrigerator with an integrated assembly according to the invention has the advantage that the major components of the assembly are kept cool because they are positioned in the refrigerator space. This is very advantageous in view of the hygienic demands. The only part which is susceptible to contamination and which is not within the refrigerator space and which is therefore not cooled is the downstream end of the fluid channel because that downstream end generally will extend outside of the refrigerator space. The susceptibility to contamination of this downstream end may be minimized in other ways to be described later.

The invention also comprises a system for providing coffee, wherein the system comprises:
- an assembly or a refrigerator according to invention;
- a coffee machine for providing coffee to a user;
- wherein the coffee machine and the assembly are connected to form an integrated unit with an integrated control system that is operable by means of a user interface that is provided on the coffee machine.

The system for providing coffee according to the invention has the advantage that coffee including fresh milk or fresh milk products, such as frothed milk, or even frothed chocolate or almond milk can be dispensed from a single machine. Furthermore, a user only has to operate a single user interface to be provided with a (coffee) product. The system may be of a modular design. Such a modular design allows either one of the coffee machine or the fluid frothing assembly to be replaced with a different unit. This is for example beneficial if one of the components breaks down, or when a different coffee machine is required as part of the system.

Additionally, the invention comprises a method for cleaning an assembly for frothing a fluid, wherein the method includes:
- providing an assembly for frothing a fluid according to the invention or a refrigerator according to the invention;
- establishing a fluid connection between the fluid inlet and the cleaning reservoir;
- performing a cleaning cycle, including:
  - switching the valve assembly from the first state to the second state;
  - adding cleaning agent to the reservoir;
  - recirculating the cleaning agent at least once through the closed circuit that is formed by the fluid channel including the fluid inlet, the return channel and the cleaning reservoir;
  - switching the valve assembly from the second state to the first state;
  - dispensing the cleaning agent through the fluid outlet;
- performing a flushing cycle, including:
  - filling the cleaning reservoir with water;
  - flushing the fluid channel including the fluid inlet and the fluid outlet with water from the cleaning reservoir.

The method for cleaning a fluid frothing assembly according to the invention has the advantage that it significantly reduces the amount of cleaning agent that is required for cleaning the assembly. This is by virtue of the fact that the cleaning agent that is used in the cleaning process is recirculated within a closed circuit formed in the assembly. As a result, a relatively small amount of cleaning agent is required for cleaning compared to cleaning methods used in the prior art.

Additionally, the cleaning method according to the invention provides the advantage that the method can be performed without having to partially disassemble the assembly and without having to connect additional parts to the assembly to facilitate the cleaning process. The components that are required for cleaning the assembly according to this method are all integrally provided in the assembly. As a result, the downtime of the assembly during cleaning thereof is relatively limited when compared to the cleaning methods for assemblies for frothing a fluid known in the prior art.

In an embodiment, the establishing of the connection between the fluid inlet and the cleaning reservoir may be effected manually by removing the fluid inlet, for example embodied as a dip tube, from the fluid reservoir, such as e.g. a milk carton, and by inserting the fluid inlet into the cleaning reservoir.

This embodiment has the advantage compared to prior art devices that the fluid inlet, such as for example embodied as a dip tube, is cleaned on both, at the outside and at the inside. The outside cleaning of the dip tube is often forgotten by the operator in prior art devices since it is not a part of the automated cleaning process.

Furthermore, the method may be elaborated by using an automated or remotely operable connection between the return channel and the at least one fluid channel, which allows automated or computer-guided execution of the cleaning program.

Various embodiments are claimed in the dependent claims, which will be further elucidated with reference to some examples shown in the figures. The embodiments may be combined or may be applied separately from each other.

DETAILED DESCRIPTION

Figure 3:
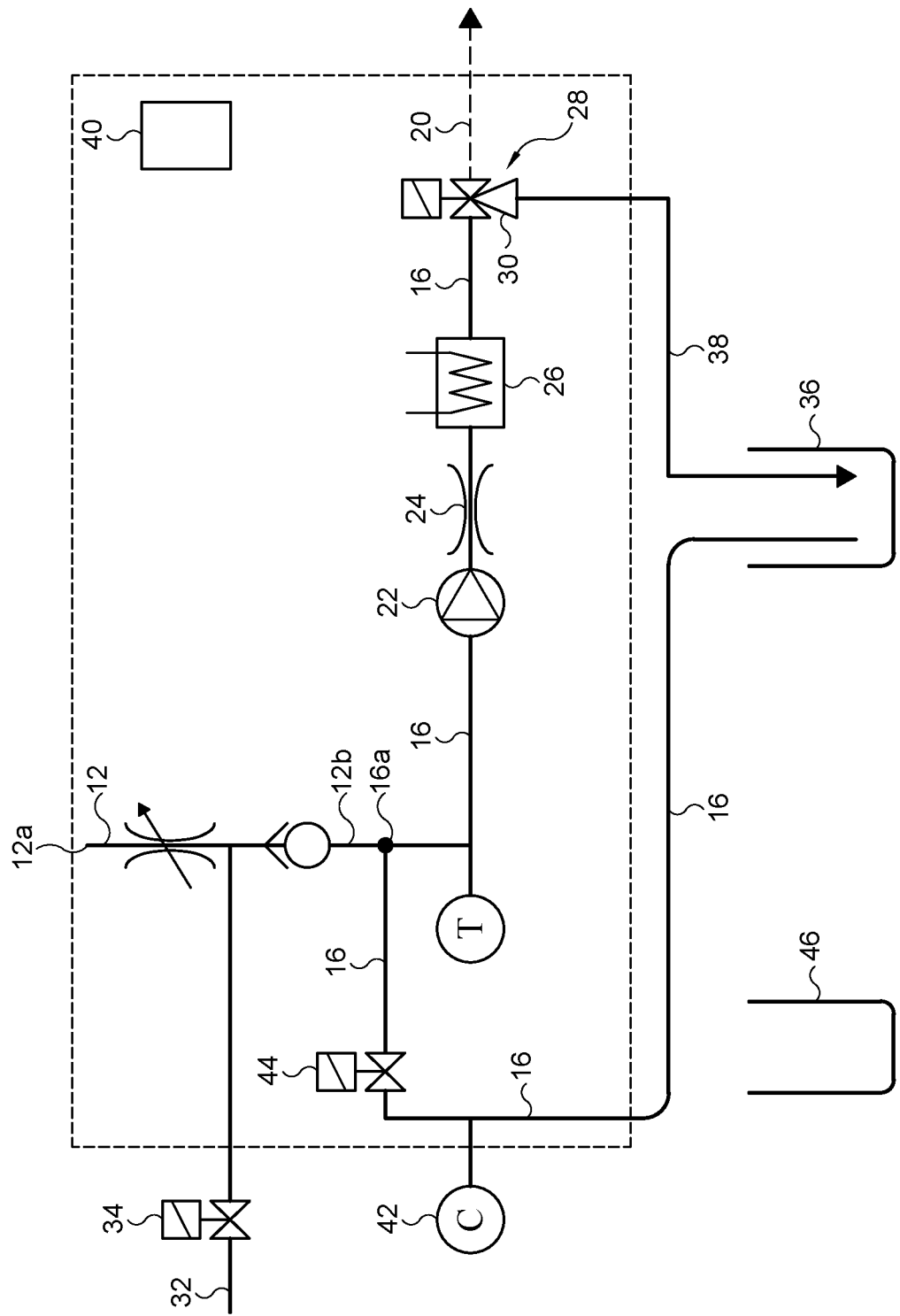
FIG. 3 shows the example of FIG. 1 in a recirculating cleaning phase of the cleaning mode.
Figure 4:
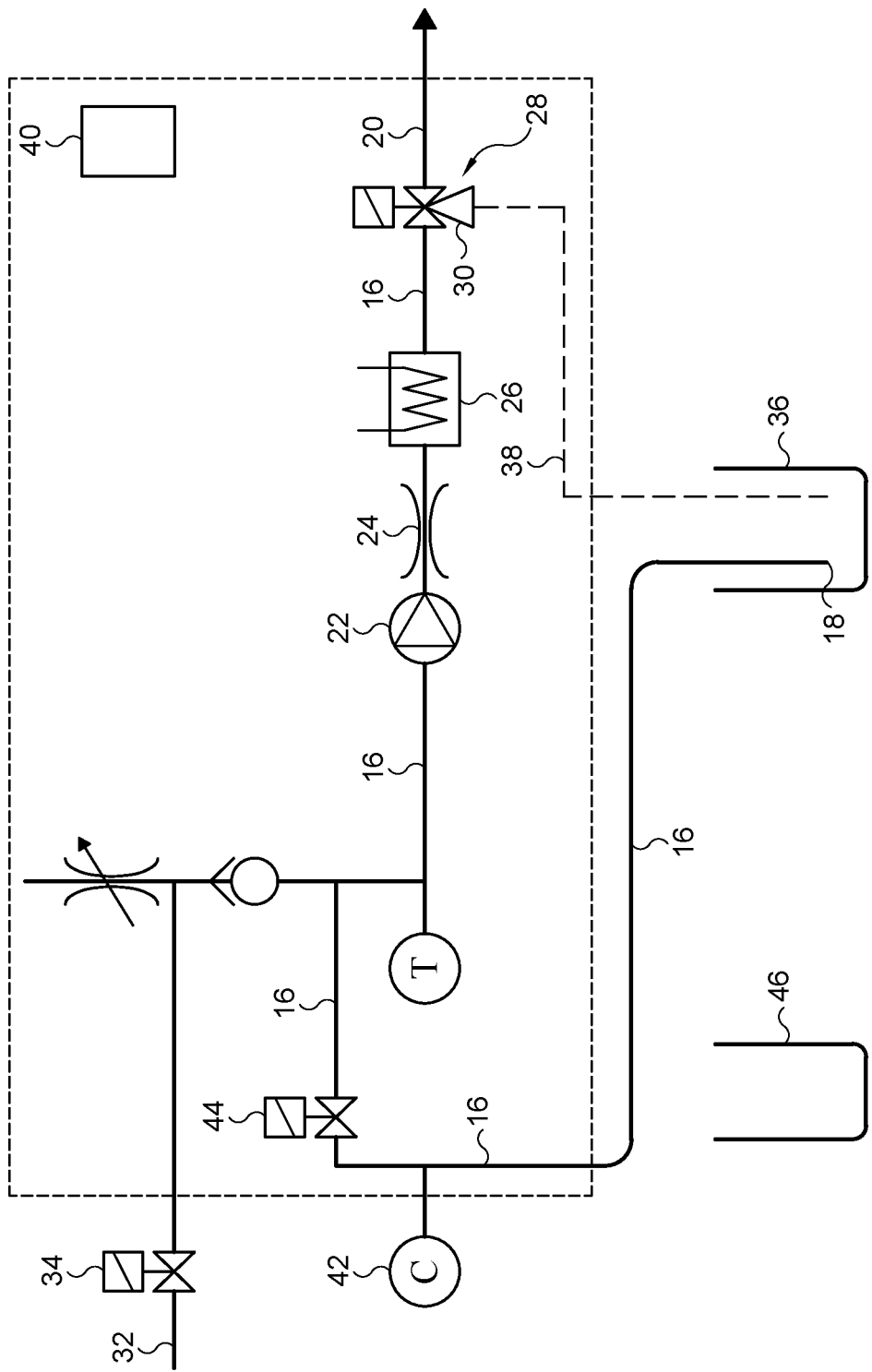
FIG. 4 shows the example of FIG. 1 in an after-flushing phase of the cleaning mode.
Figure 5:
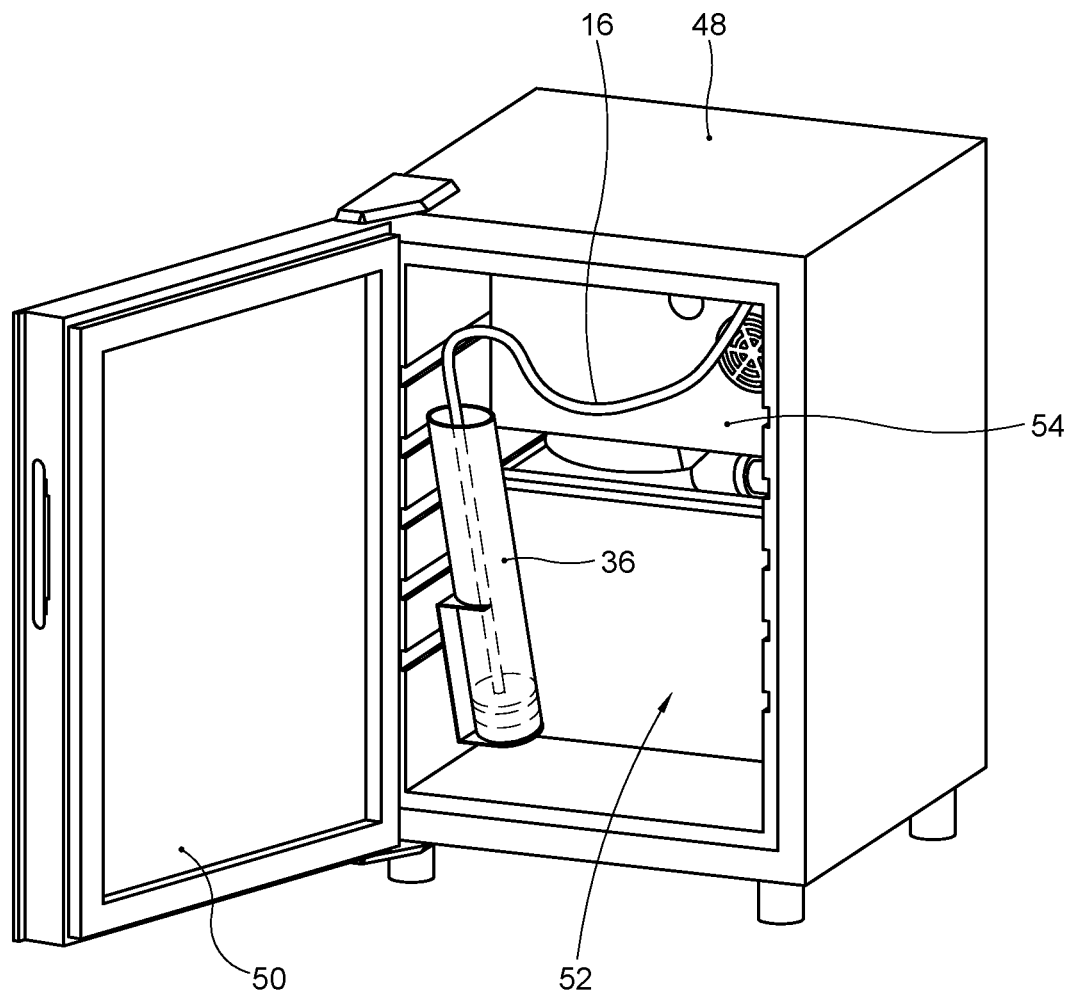
FIG. 5 shows an example of a refrigerator in which an assembly for frothing is mounted.
Figure 6:
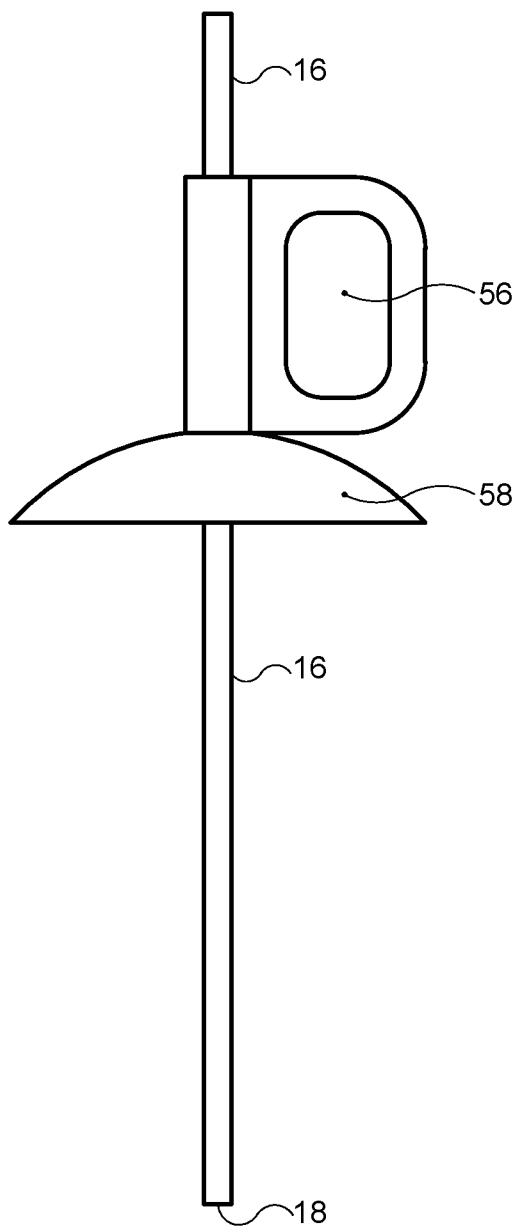
FIG. 6 shows an example of a dip tube with gripper handle and cap.

FIGS. 1-4 schematically show an example of the assembly for frothing a fluid according to the invention. FIG. 5 shows a practical embodiment of a refrigerator including such an assembly. FIG. 6 shows a practical example of a fluid inlet with gripper and cap.

In most general terms, the invention comprises an assembly for frothing a fluid including controllable air source assembly including an air channel 12 having an air inlet 12a and a downstream end 12b. Optionally, the controllable air source assembly may include an air source having a supra-atmospheric pressure. A pressure regulator may be part of the air source. Alternatively, a controllable air valve 14 may be included in the air channel 12. It should be noted that the controllable air valve 14 does not have to be a continuously variable controllable air valve 14 but may very well also include an simple two-state air valve 14 having an open and a closed state, wherein the electronic controller is configured to operate the air valve 14 to bring it in the open and in the closed state. The air source may be embodied as an air cylinder or as an air pump. The invention furthermore includes a fluid channel 16 that extends from a fluid inlet 18 to a fluid outlet 20. The fluid channel 16 subsequently includes an air inlet emanation point 16a to which the downstream end 12b of the air channel 12 is connected, a pump 22, a fixed fluid restriction 24, a heater 26 and a valve assembly 28. The valve assembly 28 has a first state, in which fluid is channeled to the fluid outlet 20 of the fluid channel 16. The valve assembly 28 also has a second state, in which the fluid is diverted from the fluid channel 16 to a second fluid outlet 30 of the valve assembly. The assembly also includes a water supply channel 32. The water supply channel 32 is connected to the fluid channel 16 and includes a controllable water valve 34. In one embodiment, the water supply channel 32 may be directly connected to the fluid channel 16. In another embodiment, of which an example is shown in FIGS. 1-4, the water supply channel 32 may be connected to the air channel 12 and via that air channel 12 be connected to the fluid channel 16. The assembly 10 furthermore includes a cleaning reservoir 36 and a return channel 38. The return channel 38 has an upstream end that is connected to the second fluid outlet 30 of the valve assembly 28. The return channel 38 also has a downstream end that emanates in the cleaning reservoir 36. The assembly 10 also comprises an electronic controller assembly 40 that is configured to control at least the pump 22, the heater 26, and the valve assembly 28. The electronic controller assembly 40 is configured to operate the assembly in a production mode and in a cleaning mode. In the production mode, the fluid inlet 18 of the fluid channel 16 is supplied with fluid to be frothed. During at least part of the cleaning mode, the fluid inlet 18 of the fluid channel 16 is supplied with cleaning fluid.

Several advantages of the assembly according to the invention have been discussed in the summary, to which reference is made. Several embodiments of the assembly can be envisioned.

In an embodiment, the cleaning fluid that is supplied to the fluid inlet 18 of the fluid channel 16 may be taken from the cleaning reservoir 36. To that end, the assembly may be configured to fill the cleaning reservoir 36 in the first phase of the cleaning mode with cleaning fluid, such as cold water, hot water, or cleaning agent. The assembly 10 may of example be provided with an automatic cleaning agent supply module that is configured to supply an amount of cleaning agent to the cleaning reservoir 36 after starting the cleaning mode. However, in a less complex assembly, the cleaning agent may also be provided by a user that starts the cleaning mode. The assembly 10 may then be configured to provide a reminder to the user to add cleaning agent, for example a tablet or pill, to the cleaning reservoir 36.

Furthermore, the assembly 10 may be configured to provide fluid from a single fluid reservoir 36 by means of the fluid inlet 18. In a more elaborate embodiment of the invention, the assembly may also comprise a plurality of fluid inlets that can be connected with different fluid reservoirs to provide different types of frothed fluids. Most conveniently, each one of the plurality of fluid inlets could be provided with a flow-back protection or valve to selectively provide only a single fluid to the assembly to prevent unwanted mixing of different fluids during production mode.

The fluid inlet 18 is, during production, connected to or inserted in a fluid source, for example a milk carton, to supply a fluid to be frothed to the assembly 10. This may for example comprise a fluid inlet 18 that is inserted in a fluid reservoir such as a milk carton or milk bottle. In the cleaning mode, the fluid inlet should then be connected to or inserted into the cleaning reservoir, so that cleaning fluid that is present in the cleaning reservoir can be supplied to fluid inlet 18 of the fluid channel 16. However, it can also be envisioned that the fluid inlet 18 comprises a, for example a three-way-valve and an additional fluid line (not shown) that extends from the valve to the cleaning reservoir. The valve may be regulated by the electronic controller assembly to supply fluid from a fluid reservoir to the fluid inlet during the production mode, and to supply cleaning fluid from the cleaning reservoir to the fluid inlet in the cleaning mode. Such a construction, especially when combined with an automatic cleaning agent dispenser, may provide a fully automated assembly, in which the user only has to start the cleaning mode, for example by choosing the cleaning mode on of user interface that may, for example, be embodied as a graphical user interface (GUI). And even the starting of the cleaning mode may be automated so that the assembly is cleaned automatically, for example during the night.

In an embodiment, the assembly may comprise at least one conductivity sensor 42 that is positioned in the fluid channel (16).

The conductivity sensor 42 may be used to measure the conductivity of the fluid in the fluid channel 16. The conductivity of the fluid may be used as an indicator of the concentration of cleaning agent within the water/cleaning agent-mixture in the fluid channel 16, for example during an after flushing phase in the cleaning mode. When the concentration of cleaning agent within the water is high, the conductivity of the water/cleaning agent-mixture is less then when the fluid channel 16 contains pure water without cleaning agent. Also, the conductivity of the fluid may be used as an indicator of the concentration of the fluid, such as for instance milk, in the fluid channel, for example, during a pre-flushing phase of the cleaning mode. Again, a higher concentration of e.g. milk within the channel will lead to a lesser conductivity than when the fluid channel contains water without milk. Thus, the signal of the conductivity sensor 42 may be used as an indication that the pre-flushing phase may be ended or that the after flushing phase may be terminated. The conductivity sensor 42 may also be used to establish the presence or absence of water or the presence or absence of a fluid in the fluid channel 16.

In an embodiment, of which an example is shown in FIGS. 1-4, the assembly may comprise a controllable fluid valve 44 that is configured to selectively close off the fluid channel 16. The controllable fluid valve 44 may be positioned in the fluid channel 16 between the fluid inlet 18 and the air inlet emanation point 16*a*.

A controllable fluid valve 44 may advantageously be used to dose the amount of fluid that is provided to the assembly for dispensing. After a predetermined amount of fluid has flowed through the controllable fluid valve 44, the valve may be closed to prevent additional fluid from flowing towards the pump.

Moreover, when the controllable fluid valve 44 is placed between the fluid inlet 18 and the air inlet emanation point 16*a*, it may be used to provide an air plug to clean the fluid channel 16 from residual fluid after dispensing the frothed fluid from the fluid outlet 20. The controllable fluid valve 44 prevents air from flowing towards the fluid inlet 18 and a fluid reservoir that may be connected to the fluid inlet 18. Instead, the air flow is directed through the fluid channel 16 towards the fluid outlet 20 so that any remaining (frothed) fluid is substantially driven out of the fluid outlet 20. This allows a more hygienic operation of the assembly, since the decay of fluid residues is substantially prevented because of the absence of fluid in the fluid channel 16.

In an embodiment, the electronic controller assembly 40 may be configured to control the controllable fluid valve 44 and the controllable water valve 34. The control may be such that, during the cleaning mode, water can be guided through the valve assembly 28 towards the cleaning reservoir 36.

Thus, the cleaning reservoir 36 may be filled with water to which a cleaning agent may be added, for example by means of a cleaning tablet which is dropped in the cleaning reservoir 36 automatically or by a user.

In an embodiment, the heater may include a thick film flow through heating element.

A thick film flow through heating element provides several advantages over heating elements used in prior art devices, such as electrical resistance rods. A thick film heating element has a low thermal mass and a relatively steep temperature profile. As a result, the heater 26 is capable of heating up and cooling down in a relatively short period. This makes it possible to provide a single channel through which both hot frothed fluid and cold frothed fluid can be dispensed without incurring either long periods between subsequent dispensings or cross-temperature effects between dispensings. The use of a flow through thick film heating element therefore allows a more compact and simple construction, wherein only a single fluid channel is required from which both hot and cold frothed fluids can alternatingly be dispensed. An example of a flow through thick film heating element is the FHT mkII which is marketed by Ferro Techniek B.V. from The Netherlands.

In the device disclosed in EP 0.485.320 A1 the heating rod and the dispensing channel had to be cooled off using cold water in order to be able to successively provide hot frothed fluid and, directly thereafter, cold frothed fluid. This known solution is not feasible because the subsequent dispensing of hot and cold frothed fluid should be possible without intermediate waiting time for cooling off the components within the assembly. In EP 2.120.656 two separate channels were positioned after the frothing unit and a three-way-valve. The hot frothed fluid is dispensed through a channel that is provided with a heating unit, whereas the cold frothed fluid is dispensed through a separate channel in order to prevent unwanted heating of the cold frothed fluid. This known solution is complex and more costly. Apart from that, it is also less durable and more vulnerable to contamination because of the presence of the three-way-valve and the two parallel channels of which one may sometimes be used only scarcely.

An additional advantage of the use of a flow through thick film heater is that the heater 26, by virtue of the short period required to heat up and cool down, can be switched off, rather then be kept in standby mode. This reduces the energy use of the assembly 10, while still providing high availability.

In an embodiment, the heater 26 is a high pressure flow-through thick film heater, and more preferably an ultra-high pressure flow-through thick film heater.

A flow-through thick film heater can be cleaned relatively easily by forcing cleaning fluid to flow through the heater, instead of having to disassemble the heater, such as for example is disclosed in EP 0.485.530 A1. Therefore, a flow-through thick film heater is most preferable in the assembly according to the invention, because it allows a closed circuit for the cleaning fluid to be formed in the cleaning mode of the assembly.

In an embodiment, the fixed fluid restriction 24 may extend along a central axis over a predetermined length, wherein the restriction may comprise an orifice.

A fixed fluid restriction 24 has the advantage that a constant quality of frothed fluid can be produced and has the advantage of being of a simple and durable construction which is not, or only to a very limited extend vulnerable for contamination.

In an embodiment, the length of the restriction 24 may be in the range of 1 mm to 8 mm, and may preferably be 4 mm. The orifice of the restriction 24 may be in the range of 0.4 mm to 1.5 mm and may preferably be 0.7 mm.

In an embodiment, the restriction 24 may be integrated part of the pump 22.

The pump 22 may be provided with a recess in which the restriction 24 may be fitted. This allows for a more compact assembly, while simultaneously retaining the constant frothing quality that may be produced using a fixed fluid restriction 24.

In an embodiment, the assembly may comprise a fluid reservoir 46 for holding fluid to be frothed. In the production mode, the fluid inlet 18 may be inserted in or may at least be connected to the fluid reservoir 46, such that, during the production mode, fluid to be frothed may be supplied to the fluid channel 16. In the cleaning mode, the fluid reservoir 46 and the fluid inlet 18 may be disconnected. This may be effect by removing the fluid inlet 18, for example embodied as a dip tube, from the fluid reservoir 46 and by placing the fluid inlet 18 into the cleaning reservoir 36. This has the advantage that the fluid inlet 18 is cleaned both at that inside and at the outside.

The fluid to be frothed may be provided in a fluid reservoir 46. The reservoir 46 may comprise a removable, refillable reservoir or container that may be refilled after it has been emptied. However, the reservoir 46 may also be formed by a widely available standard fluid packaging, such as a fluid carton, a fluid container or similar. This allows easy replacement of the fluid reservoir 46 after it has been emptied without the need to clean it. In addition, the fluid inlet 18 may in such cases for example be inserted in or connected to the packaging in order to allow fluid extraction from the packaging into the fluid inlet 18. During cleaning mode, the fluid inlet 18 only has to be retracted from the fluid packaging and subsequently be connected to or inserted in the cleaning reservoir 36 in order to establish a fluid connection between the fluid inlet 18 and a cleaning fluid present in the cleaning reservoir 36.

In an embodiment, of which an example is shown in FIG. 6, the assembly may comprise a gripper element 56 that is connected to the fluid channel 16 near the fluid inlet 18. In the example shown in FIG. 6, the fluid inlet 18 is a stiff dip tube which may be manufactured from a metal or a rigid non-porous plastic. Alternatively, the fluid inlet 18 may be a flexible tube. However, a stiff dip tube is more convenient to place in a fluid container 46 and in the cleaning reservoir 36.

When the fluid inlet 18 is configured to be transferred from the fluid reservoir 46 to the cleaning reservoir 36 by a user or operator, the fluid inlet 18 is subject to pollution or bacteria that are present on the hands of the user or operator. To prevent fouling of the fluid inlet 18 before and, more important, after completion of the cleaning mode, the fluid inlet 18 is provided with a gripper 56 that is attached to the fluid channel 16 near the fluid inlet 18. This allows a user or operator to transfer the fluid inlet 18 from the fluid reservoir 46 to the cleaning reservoir 36 and reversely in a hygienic manner.

In an embodiment, of which an example is shown in FIG. 6, the gripper element 56 comprises a cap 58, for example an umbrella-shaped cap, that is placeable over an opening of a fluid reservoir 46 in which the fluid inlet 18 is inserted.

The gripper 56 may be provided with a cap 58, which allows the gripper 56 to be conveniently placed over an opening of the fluid reservoir 46, so that the fluid reservoir 46 is substantially closed off. Therewith, the cap 58 forms a seal that prevents fouling of the fluid in the fluid reservoir 46, while simultaneously providing a handhold for removing the fluid inlet 18 from the fluid reservoir 46 without fouling or damaging the fluid inlet 18 or the fluid channel 16.

In an embodiment, the assembly may comprise a graphical user interface to allow users to provide input to the electronic controller assembly 40. The electronic controller assembly 40 may be programmed to allow users to choose from at least the following options: execute the cleaning mode and execute the production mode. The production mode at least comprises the production and dispensing of an amount of cold frothed fluid or the production and dispensing of an amount of hot frothed fluid.

Figure 1:
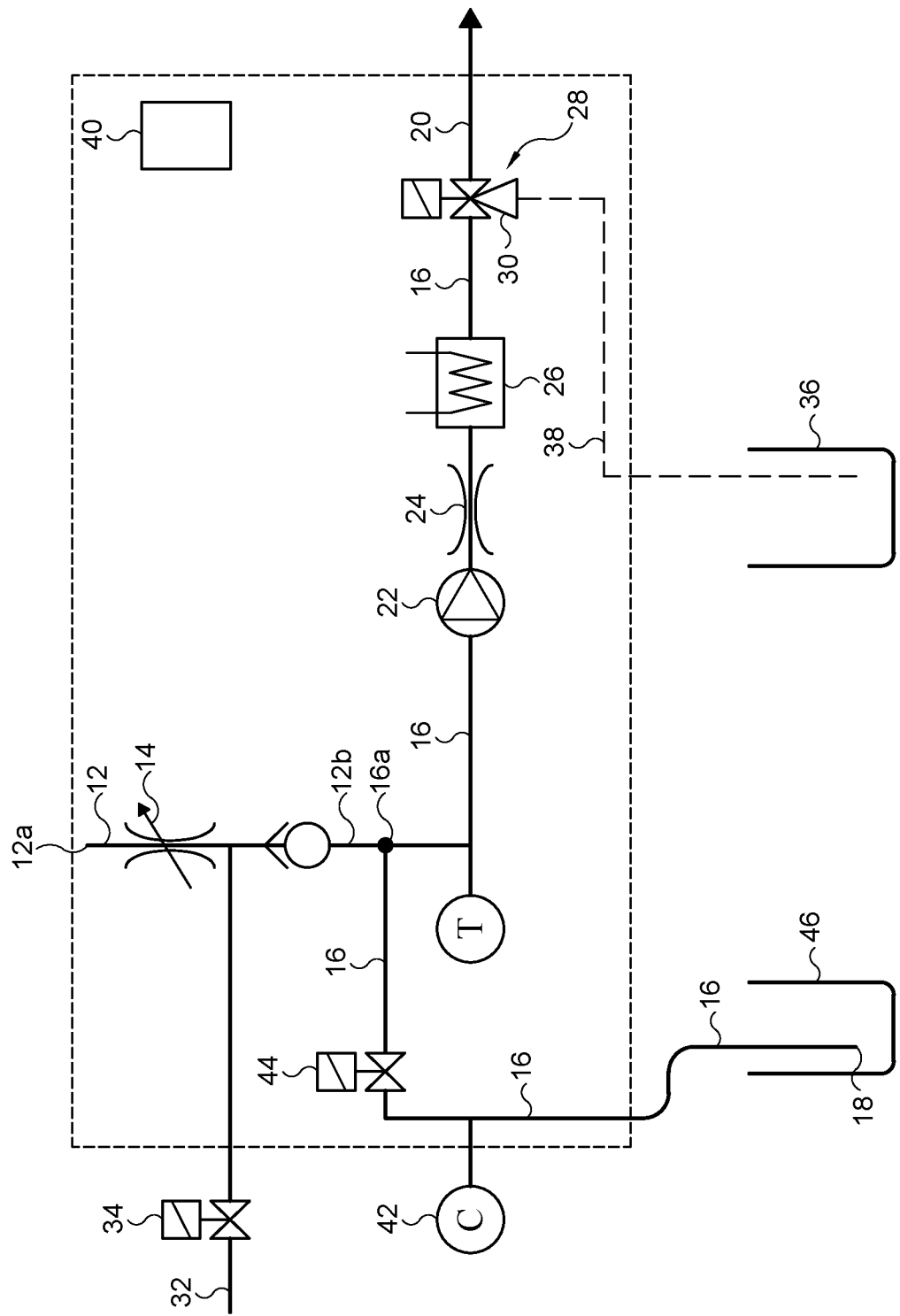
FIG. 1 shows schematically an example an assembly for frothing a fluid in a production mode.
Figure 2:
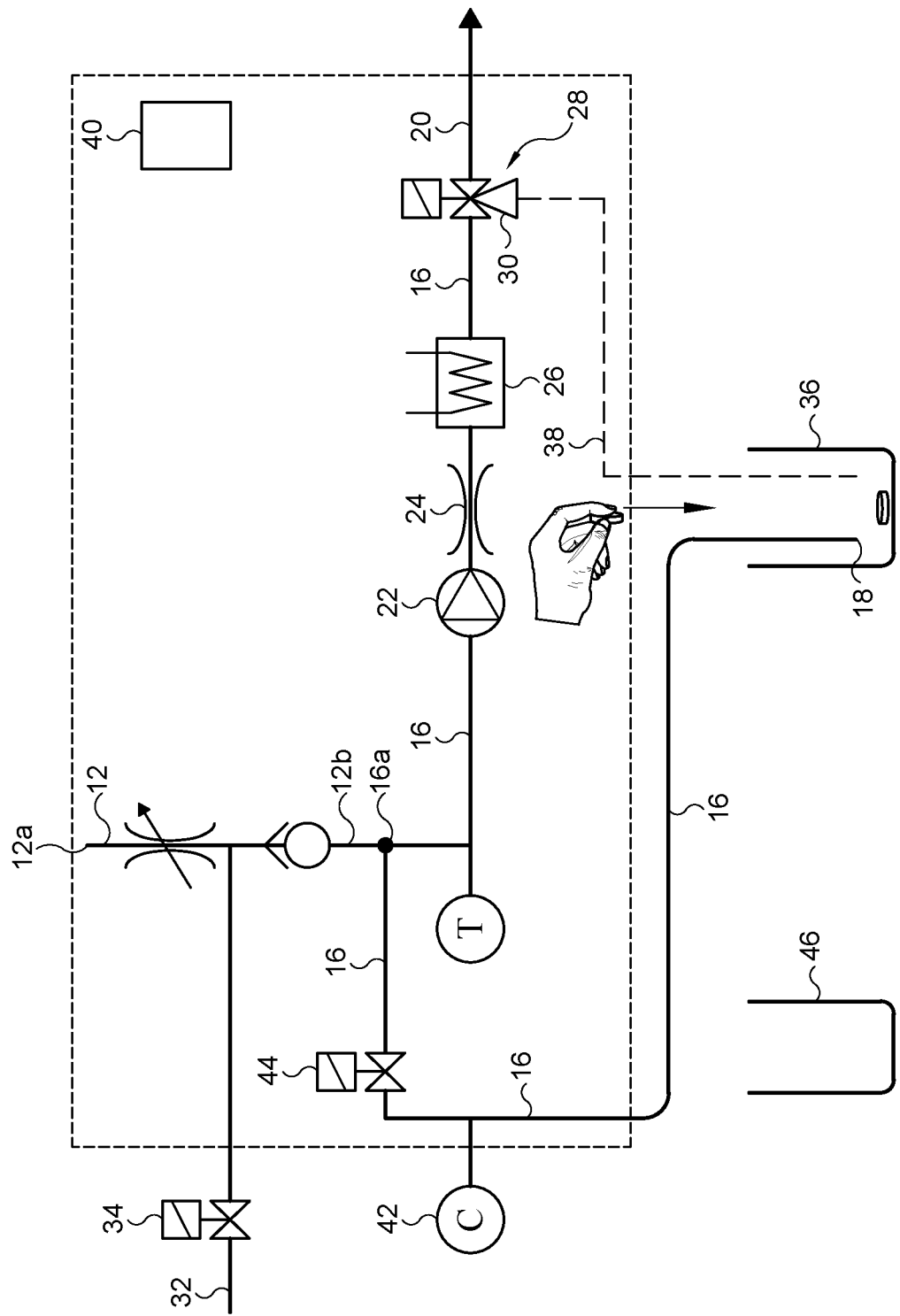
FIG. 2 shows schematically the example of FIG. 1 in a pre-flushing phase of the cleaning mode.

In an embodiment, the electronic controller 40 may be configured to control the assembly 10 during the cleaning mode such that, the following actions are performed after the fluid inlet 18 has been removed from the fluid supply 46 and has placed in or connected to the cleaning reservoir 36. Fluid from the fluid channel 16 may be removed by flushing the fluid channel 16 at least once with lukewarm or cold water by opening the water valve and bringing the valve assembly in the first state. This can be considered to be a pre-flushing phase which is shown in FIG. 2. The lukewarm water effectively removes proteins from the fluid channel 16 without the risk of coagulation of the proteins within the fluid channel 16 and the components included therein. Additionally, when the cleaning agent is provided by dropping a cleaning agent tablet in the cleaning reservoir 36, the tablet will not, or only to a very limited extend dissolve in the cold or lukewarm water so that in the pre-flushing phase the flushing is done with water and the cleaning agent is not flushed away via the fluid outlet 20 in the pre-flushing phase. During the cleaning mode, cleaning agent is provided in the cleaning reservoir 36. This may be done before or after the pre-flushing phase. The cleaning agent may be provided by dissolving a cleaning agent tablet in water, wherein the cleaning agent is obtained substantially only after the water has been heated. Alternatively, the cleaning agent may be added in liquid form. The clean tablet or cleaning liquid may be added to the cleaning reservoir by a user or automatically by a dispenser. Subsequently, the cleaning agent is recirculated through the fluid channel 16, via the fluid inlet 18 that is positioned in or connected to the cleaning reservoir 36, the pump 22, the fixed fluid restriction 24, the heater 26, the valve assembly 28 in the second state, the return channel 38 and the cleaning reservoir 36. This is a recirculation cleaning phase which is shown in FIG. 3. After that, the cleaning agent may be removed from the cleaning reservoir 36 and the fluid channel 16 by bringing the valve assembly 28 in the first state. Finally, the assembly 10 may be flushed in a so-called after-flushing phase which is shown in FIG. 4. In the after-flushing phase, the assembly 10, more particularly the fluid channel 16 is flushed in at least one flush cycle including:

supplying tap water to the fluid channel 16 and at least partly filling the cleaning reservoir 36 with the tap water by opening the water valve 34 and bringing the valve assembly 28 in the second state;

removing the tap water from the fluid channel 16 and the cleaning reservoir 36 by bringing the valve assembly 28 in the first state to flush any remaining cleaning agent from the fluid channel 16 and the cleaning reservoir 36 and to cool the assembly 10.

By virtue of the recirculation, only a very little amount of water is needed to effectively clean the fluid channel 16 and all the components incorporated therein.

In an embodiment, the controller 40 may be configured to activate the heater during recirculation of the cleaning agent to heat the cleaning agent that is circulated.

Heated cleaning fluid may lead to a better and faster cleaning of the system. Thus, the cleaning mode may take a shorter period of time which is good for the availability of the system in the production mode. Heating during the recirculation cleaning phase may also lead to an effective dissolving of a cleaning tablet that has been dropped in the cleaning reservoir 36.

In an embodiment of the assembly that is provided with a conductivity sensor 42, the electronic controller 40 may monitor a signal provided by the conductivity sensor 42 during the flushing and may be configured to repeat the flushing cycles until the conductivity signal indicates a conductivity value that is above a predetermined threshold value.

This may be done both in the pre-flushing phase and in the after-flushing phase. The conductivity sensor signal may also be used for other purposes, for example, monitoring the presence or absence of a liquid in the fluid channel 16 and monitoring whether the concentration of the cleaning agent in the water/cleaning-agent mixture is sufficient to obtain a good cleaning result. When the conductivity signal indicates that the concentration of the cleaning agent in the mixture is too low, the controller 40 may, in response, activate the heater 26 to increase the temperature of the water in order to promote the dissolving of, for example, the cleaning tablet in the water.

As will be clear from the previous paragraphs, in an embodiment, the cleaning agent may be provided in the cleaning reservoir by dropping a cleaning tablet in the reservoir 36 and by subsequently circulating and heating water via the fluid channel 16, the return channel 38 and the cleaning reservoir 36 thereby dissolving the cleaning tablet in the heated water.

In an embodiment in which the assembly comprises a fluid reservoir 46, the fluid reservoir 46 may be a disposable milk can, a milk carton or a milk container. The fluid to be frothed may be milk. However, other fluids than milk are also feasible, for example, chocolate milk or almond milk and whipped cream.

The assembly 10 may comprise a fluid reservoir 46 that is formed by a disposable fluid packaging. That packaging may be a disposable fluid packaging for milk, which is placed in the assembly for producing frothed milk. The fluid may in such case be milk, almond milk, lactose-free milk, soy milk, chocolate milk or any other type of milk-product.

The invention also provides a refrigerator comprising a housing 48 bounding a refrigerator space 52 in which an assembly according to the invention is accommodated. The housing includes a door 50 that has an open position in which the refrigerator space 52 is accessible via a door opening and a closed position for closing off the door opening. The assembly for frothing a fluid according to the invention, at least the major components thereof, may be accommodated within the refrigerator space 52. The major components of the assembly 10 for frothing a fluid which are accommodated within the refrigerator space 52 include at least the pump 22, the fluid restriction 24, the heater 26, the valve assembly 28, the cleaning reservoir 36 and the return channel 38.

The refrigerator space 52 may be refrigerated to a relatively low temperature to optimize the cooling for the components. In addition, having a refrigerated housing space 52 may allow the fluid reservoir 46 to be placed in the housing space 52 of the housing 48, so that the fluid contained in the reservoir 46 may be kept from decay. This may for example be important with perishable goods, such as milk or custard-based products.

Furthermore, by designing the components of the assembly 10 for refrigerated spaces, the assembly may be retrofitted in existing refrigerators.

In an embodiment, the assembly 10 may comprise a component tray 54. The component tray 54 may be removably mounted in the housing space 52. The component tray 54 may be removable from the housing space 52 in the open position of the door 50. The component tray 54 may support at least the pump 22, the restriction 24, the heater 26 and at least part of the fluid channel 16.

The advantage of having a removably mounted component tray 54 is that the components are easily accessible for repair of maintenance. In addition, the component tray 54 may be designed such that the components provide an optimal performance while simultaneously reducing the required installation space, thus allowing a compact and reliable product. Also, the component tray may, in case of repair, maintenance or replacement be removed from the housing space 52, after which the door 50 may be closed again in order to retain a low inner temperature in the refrigerator space 52.

In an embodiment, the cleaning reservoir 36 is removably mounted in the housing 48, wherein the mounting position of the cleaning reservoir 36 is such that the cleaning reservoir 36 is accessible via the door opening in an open position of the door 50.

Placing the cleaning reservoir 36 is an easily accessible place within the refrigerator space 52 is preferable when the addition of a cleaning agent to the cleaning reservoir is not automated. In such case, a user or operator should be able to quickly access the cleaning reservoir 36 to add cleaning agent to the cleaning reservoir 36. The location should preferably be chosen such that any accidental spills of cleaning agent in the housing 48 will not harm the other components of the assembly or may enter the fluid reservoir 46 and/or the fluid channel 16.

In an embodiment, in which the assembly is provided with a fluid reservoir 46, the fluid reservoir 46 may be removably positioned in the refrigerator space 52. The position of the fluid reservoir 46 may be chosen such that the fluid reservoir 46 is removable from the refrigerator space 52 without removing any other assembly component from the housing 48.

It is most advantageous to position the removable fluid reservoir 46 near the door opening and the door 50 of the housing 48. This allows the reservoir 46 to be refilled or replaced without the need to remove any other components of the assembly 10.

The invention also provides a system for providing coffee. The system comprises an assembly 10 or a refrigerator according the invention and a coffee machine for providing coffee to a user. The coffee machine and the assembly or refrigerator are connected to form an integrated unit with an integrated control system that is operable by means of a user interface that is provided on the coffee machine. The user interface may be embodied as a graphical user interface (GUI). However, also a conventional user interface with conventional buttons is feasible for operating the integrated control system.

The advantages of the system for providing coffee have been described in the summary, to which reference is made here.

The invention also provides a method for cleaning an assembly for frothing a fluid. The method includes providing an assembly for frothing a fluid according to the invention. The method further includes establishing a fluid connection between the fluid inlet and the cleaning reservoir and performing a cleaning cycle. The cleaning cycle includes switching the valve assembly from the first state to the second state, adding cleaning agent to the reservoir and recirculating the cleaning agent at least once through the closed circuit that is formed by the fluid channel including the fluid inlet, the return channel and the cleaning reservoir. The cleaning cycle also comprises switching the valve assembly from the second state to the first state and dispensing the cleaning agent through the fluid outlet. The method further includes performing a flushing cycle that includes filling the cleaning reservoir with water and flushing the fluid channel including the fluid inlet and the fluid outlet with water from the cleaning reservoir.

The advantages of the method according to the invention have been described in the summary, to which reference is made here.

In an embodiment, the cleaning cycle may include filling the cleaning reservoir at least partially with water and adding a cleaning agent to the cleaning reservoir. Subsequently, the method comprises mixing the cleaning agent and the water to form a cleaning agent/water-mixture in the cleaning reservoir and circulating the cleaning agent/water-mixture at least once through the closed circuit that is formed by the fluid channel including the fluid inlet, the return channel and the cleaning reservoir.

In an embodiment the cleaning agent may be a solid substance, for example a tablet or a pill that is soluble in water. The mixing of the cleaning agent and the water may involve at least partially dissolving the solid substance in the water that is present in the cleaning reservoir.

In order to prevent spills of cleaning agent when adding the agent to the cleaning reservoir, the cleaning agent may be provided in the form of a solid substance, that is soluble in water. Dissolving the solid substance can be carried out within the cleaning reservoir, when water is added to the cleaning reservoir.

In an embodiment, the cleaning cycle may additionally include supplying a predetermined amount of air to the cleaning reservoir after filling it at least partially with water, such that turbulence is created for at least partially dissolving the solid cleaning agent in the water to form the cleaning agent/water-mixture. The method may further include measuring the conductivity of the cleaning agent in the fluid channel and comparing the measured conductivity against a predetermined threshold value. The method may also include supplying a second predetermined amount of air to the cleaning reservoir if the measured conductivity is higher than the predetermined value to further promote the dissolving of the cleaning agent tablet in the water.

The solid cleaning agent may not directly dissolve in the water prior to the circulation of the formed cleaning agent/water-mixture. The conductivity of the mixture decreases as the amount of dissolved cleaning agent in the mixture increases. By measuring the conductivity of the mixture and comparing the measured value against a predetermined threshold value representing a mixture in which the cleaning agent is substantially completely dissolved, it can be determined whether the mixture is adequate for cleaning the assembly. If the measured conductivity is higher than the predetermined set value that is desired, the mixture in the cleaning reservoir is supplied with an amount of air. The turbulence that is created, promotes the solid cleaning agent to dissolve into the mixture, therewith reducing the conductivity of said mixture. The conductivity measurement and air-input step may be executed several times in succession in order to allow substantially all of the cleaning agent to dissolve in the mixture. Therewith, this embodiment provides a method to ascertain that the cleaning agent/water-mixture contains sufficient cleaning agent to thoroughly clean the assembly.

In an embodiment, the method may include flushing the at least one fluid channel and the fluid outlet with air prior to executing the cleaning cycle.

Flushing the at least one fluid channel with an 'air plug' is advantageous as fluid residues are removed from the assembly by forcing it out through the fluid outlet. This may help to reduce the amount of cleaning agent and/or the number of cleaning cycles that needs to be performed in order to clean the assembly.

In an embodiment, the method may include executing at least one pre-flushing cycle before executing the cleaning cycle.

Executing at least one pre-flushing cycle before executing the recirculating cleaning cycle has the advantage that at least part of the fluid residues may be removed prior to the cleaning cycle. This is most preferable with substances such as milk. Milk or similar fluids may form solid layers when it comes into contact with hot water. To prevent the formation of solid layers within the assembly, it is preferably to flush the assembly with cold or lukewarm water to prevent formation of said solid layers.

In an embodiment, the method may include heating the cleaning agent, or, alternatively a cleaning agent/water-mixture, during the recirculation.

Heating the cleaning agent or the cleaning agent/water-mixture may increase the effectiveness of the cleaning agent during the cleaning cycle. Furthermore, most bacteria have a limited resistance to heat. Thus, providing a heated cleaning agent or mixture, preferably having a temperature of 60° C. or higher, and most preferably of 80° C., provides an effective method to clean the assembly. In addition, when using a cleaning agent that is a solid substance that needs to dissolve in water, the dissolving process may only take place when using warm or hot water.

In an embodiment in which the cleaning agent is mixed with water, the method may comprise heating the water prior to and/or during mixing the cleaning agent and the water in the cleaning reservoir.

In an embodiment, the flushing cycle may include switching the valve assembly 28 from the first state to the second state and switching the valve assembly 28 from the second state to the first state after filling the cleaning reservoir 36 with water.

In an embodiment, the flushing cycle may include measuring the conductivity of the fluid in the fluid channel 16 and comparing the measured conductivity against a threshold value. The method may further include executing an additional flushing cycle if the measured conductivity is lower than the threshold value and repeating the previous steps until the measured conductivity is higher than the threshold value.

To ensure that the assembly, after the cleaning cycle, is substantially devoid of cleaning agent, a flushing step is provided. However, not all of the cleaning agent may be removed during this flushing step. Water has a relatively high conductivity when compared to cleaning agent or a mixture thereof with water. By measuring the conductivity and comparing the measured value with a predetermined set point (the desired value), it can quickly be determined whether residues of cleaning agent are still present in the assembly. When the conductivity is lower than the set point, additional flushing steps are performed until the measured value is higher than the set point. In that situation, substantially all cleaning agent is removed from the assembly and the assembly is ready to use. Experimental data have shown that usually two to four flushing steps are required to clean the assembly from any residual cleaning agent. Naturally, this depends on the amount of cleaning agent used in the cleaning cycle and the amount of water used during each flushing step.

The descriptions above are intended to be illustrative, not limiting. Thus, it will be apparent to one skilled in the art that modifications may be made to the invention as described in the foregoing without departing from the scope of the claims set out below. Various embodiments may be applied in combination or may be applied independently from one another. Reference numbers used in the above detailed description are not intended to limit the description of the embodiments to the examples shown in the figures. The figures just represent examples and the embodiments may be embodied in other ways than the specific way shown in the examples of the drawings.

LEGEND

10—assembly for frothing fluid
12—air channel
12a—air inlet
12b—downstream end of the air channel
16a—air inlet emanation point
14—controllable air valve
16—fluid channel
18—fluid inlet
20—fluid outlet
22—pump
24—fixed fluid restriction
26—heater
28—valve assembly
30—second fluid outlet 32—water supply channel
34—controllable water valve
36—cleaning reservoir
38—return channel
40—electronic controller assembly
42—conductivity sensor
44—controllable fluid valve
46—fluid reservoir
48—assembly housing
48a—first assembly housing wall
48b—second assembly housing wall
50—assembly housing door
52—housing space
54—component tray
56—gripper element
58—gripper cap

What is claimed is:

1. An assembly for frothing a fluid, the assembly comprising:
    a controllable air source assembly including an air channel having an air inlet and a downstream end;
    a fluid channel extending from a fluid inlet to a fluid outlet, the fluid channel including subsequently:
        an air inlet emanation point to which the downstream end of the air channel is connected;
        a pump;
        a fluid restriction;
        a heater;
        a valve assembly having a first state in which the fluid is channeled to the fluid outlet of the fluid channel and a second state in which the fluid is diverted from the fluid channel to a second fluid outlet of the valve assembly;
    the assembly for frothing the fluid additionally including:
    a water supply channel connected to the fluid channel and including a controllable water valve;
    a cleaning reservoir;
    a return channel having an upstream end that is connected to the second fluid outlet of the valve assembly and having a downstream end that emanates in the cleaning reservoir;
    an electronic controller assembly configured to control at least the pump, the heater, and the valve assembly, wherein the electronic controller assembly is configured to operate the assembly for frothing the fluid in a production mode and in a cleaning mode;
    wherein, in the production mode, the fluid inlet of the fluid channel is in fluid connection with a fluid supply for supplying the fluid and wherein, during at least part of the cleaning mode, the fluid inlet of the fluid channel is in fluid connection with the cleaning reservoir and is supplied with cleaning fluid taken from the cleaning reservoir to flow through the fluid channel via, subsequently, the fluid inlet, the pump, the fluid restriction, the heater and the valve assembly and selectively to (i) the fluid outlet and (ii) via the return channel, to the cleaning reservoir;
    wherein the electronic controller assembly is configured to control the assembly for frothing the fluid during the cleaning mode such that, the following actions are performed after the fluid inlet has been removed from the fluid supply and has been placed in or connected to the cleaning reservoir:
    removing the fluid from the fluid channel by flushing the fluid channel at least once with lukewarm or cold water by opening the controllable water valve and bringing the valve assembly in the first state;
    providing a cleaning agent in the cleaning reservoir;
    circulating the cleaning agent through the fluid channel, via the fluid inlet that is positioned in or connected to the cleaning reservoir, the pump, the fluid restriction, the heater, the valve assembly in the second state, the return channel and the cleaning reservoir;
    removing the cleaning agent from the cleaning reservoir and the fluid channel by bringing the valve assembly in the first state;
    flushing the assembly in at least one flush cycle including:
        supplying tap water to the fluid channel and at least partly filling the cleaning reservoir with the tap water by opening the controllable water valve and bringing the valve assembly in the second state;
        removing the tap water from the fluid channel and the cleaning reservoir by bringing the valve assembly in the first state to flush any remaining cleaning agent from the fluid channel and the cleaning reservoir and to cool the assembly.

2. The assembly for frothing the fluid according to claim 1, further comprising at least one conductivity sensor that is positioned in the fluid channel.

3. The assembly for frothing the fluid according to claim 1, further comprising a controllable fluid valve configured to selectively close off the fluid channel, wherein the controllable fluid valve is positioned in the fluid channel between the fluid inlet and the air inlet emanation point.

4. The assembly for frothing the fluid according to claim 3, wherein the electronic controller assembly is configured to control the controllable fluid valve and the controllable water valve, such that, during the cleaning mode, water can be guided through the valve assembly towards the cleaning reservoir.

5. The assembly for frothing the fluid according to claim 1, wherein the heater includes a flow through thick film heating element.

6. The assembly for frothing the fluid according to claim 1, wherein the fluid restriction is fixed and comprises an orifice which extends along a central axis over a predetermined length.

7. The assembly for frothing the fluid according to claim 6, wherein the length of the fluid restriction is in the range of 1 mm to 8 mm, and wherein a diameter of the fluid restriction is in the range of 0.4 mm to 1.5 mm.

8. The assembly for frothing the fluid according to claim 1, wherein the fluid restriction is integrated part of the pump.

9. The assembly for frothing the fluid according to claim 1, wherein, in the production mode, the fluid inlet is inserted in or at least connected to the fluid supply, such that, during the production mode, the fluid can be supplied to the fluid channel, and wherein, in the cleaning mode, the fluid supply and the fluid inlet are disconnected.

10. The assembly for frothing the fluid according to claim 1, further comprising a gripper element that is connected to the fluid channel near the fluid inlet.

11. The assembly for frothing the fluid according to claim 10, wherein the gripper element comprises a cap that is placeable over an opening of the fluid supply in which the fluid inlet is inserted.

12. The assembly for frothing the fluid according to claim 1, further comprising a graphical user interface to allow users to provide input to the electronic controller assembly, wherein the electronic controller assembly is programmed to allow users to choose from at least the following options:
    execute the cleaning mode;
    execute the production mode, wherein the production mode at least comprises:

the production and dispensing of an amount of cold frothed fluid, or the production and dispensing of an amount of hot frothed fluid.

13. The assembly for frothing the fluid according to claim 1, wherein, during circulating the cleaning agent, the electronic controller assembly is configured to activate the heater to heat the cleaning agent that is circulated.

14. The assembly for frothing the fluid according to claim 1, further comprising at least one conductivity sensor that is positioned in the fluid channel, and wherein, during the at least one flush cycle, the electronic controller assembly monitors a signal provided by the at least one conductivity sensor and is configured to repeat the at least one flush cycle until the signal indicates a conductivity value that is above a predetermined threshold value.

15. The assembly for frothing the fluid according to claim 1, wherein the cleaning agent is provided in the cleaning reservoir by dropping a cleaning tablet in the cleaning reservoir and by subsequently circulating and heating water via the fluid channel, the return channel and the cleaning reservoir thereby dissolving the cleaning tablet in the heated water.

16. The assembly for frothing the fluid according to claim 1, wherein, in the production mode, the fluid inlet is inserted in or at least connected to the fluid supply, such that, during the production mode, the fluid can be supplied to the fluid channel, wherein, in the cleaning mode, the fluid supply and the fluid inlet are disconnected, and wherein the fluid supply is a disposable milk can, a milk carton or a milk container and the fluid is milk.

17. A refrigerator comprising:
a housing bounding a refrigerator space, the housing including a door that has an open position in which the refrigerator space is accessible via a door opening and a closed position for closing off the door opening; and
an assembly for frothing a fluid, the assembly comprising:
a controllable air source assembly including an air channel having an air inlet and a downstream end;
a fluid channel extending from a fluid inlet to a fluid outlet, the fluid channel including subsequently:
an air inlet emanation point to which the downstream end of the air channel is connected;
a pump;
a fluid restriction;
a heater;
a valve assembly having a first state in which the fluid is channeled to the fluid outlet of the fluid channel and a second state in which the fluid is diverted from the fluid channel to a second fluid outlet of the valve assembly;
the assembly for frothing the fluid additionally including:
a water supply channel connected to the fluid channel and including a controllable water valve;
a cleaning reservoir;
a return channel having an upstream end that is connected to the second fluid outlet of the valve assembly and having a downstream end that emanates in the cleaning reservoir;
an electronic controller assembly configured to control at least the pump, the heater, and the valve assembly, wherein the electronic controller assembly is configured to operate the assembly for frothing the fluid in a production mode and in a cleaning mode;
wherein, in the production mode, the fluid inlet of the fluid channel is in fluid connection with a fluid supply for supplying the fluid and wherein, during at least part of the cleaning mode, the fluid inlet of the fluid channel is in fluid connection with the cleaning reservoir and is supplied with cleaning fluid taken from the cleaning reservoir to flow through the fluid channel via, subsequently, the fluid inlet, the pump, the fluid restriction, the heater and the valve assembly and selectively to (i) the fluid outlet and (ii) via the return channel, to the cleaning reservoir;
wherein components of the assembly for frothing the fluid, including at least the pump, the fluid restriction, the heater, the valve assembly, the cleaning reservoir and the return channel, are positioned in the refrigerator space; and
wherein the assembly for frothing the fluid comprises a component tray that is removably mounted in the refrigerator space, wherein the component tray is removable from the refrigerator space in the open position of the door, and wherein the component tray supports at least the pump, the fluid restriction, the heater and at least part of the fluid channel.

18. The refrigerator according to claim 17, wherein the cleaning reservoir is removably mounted in the refrigerator space, wherein a mounting position of the cleaning reservoir is such that the cleaning reservoir is accessible via the door opening in the open position of the door.

19. The refrigerator according to claim 17, wherein, in the production mode, the fluid inlet is inserted in or at least connected to the fluid supply, such that, during the production mode, the fluid can be supplied to the fluid channel, wherein, in the cleaning mode, the fluid supply and the fluid inlet are disconnected, and wherein the fluid supply is removably positioned in the refrigerator space, wherein the position of the fluid supply is such that the fluid supply is removable from the refrigerator space without removing any other components of the assembly for frothing the fluid from the housing.

20. A system for providing coffee, the system comprising:
the assembly for frothing the fluid according to claim 1;
a coffee machine for providing coffee to a user;
wherein the coffee machine and the assembly for frothing the fluid are connected to form an integrated unit with an integrated control system that is operable by means of a user interface that is provided on the coffee machine.

21. A method for cleaning an assembly for frothing a fluid, wherein the method includes:
providing the assembly for frothing the fluid according to claim 1;
establishing a fluid connection between the fluid inlet and the cleaning reservoir;
performing a cleaning cycle, including:
switching the valve assembly from the first state to the second state;
adding a cleaning agent to the cleaning reservoir;
circulating the cleaning agent at least once through a closed circuit that is formed by the fluid channel including the fluid inlet, the return channel and the cleaning reservoir;
switching the valve assembly from the second state to the first state;
dispensing the cleaning agent through the fluid outlet;
performing a flushing cycle, including:
filling the cleaning reservoir with water;
flushing the fluid channel including the fluid inlet and the fluid outlet with water from the cleaning reservoir.

22. The method according to claim 21, wherein the cleaning cycle includes:
- filling the cleaning reservoir at least partially with water;
- mixing the cleaning agent and the water to form a cleaning agent/water-mixture in the cleaning reservoir; and
- circulating the cleaning agent/water-mixture at least once through the closed circuit that is formed by the fluid channel including the fluid inlet, the return channel and the cleaning reservoir.

23. The method according to claim 22, wherein the cleaning agent is a solid substance, that is soluble in water, wherein mixing of the cleaning agent and the water involves at least partially dissolving the solid substance in the water present in the cleaning reservoir.

24. The method according to claim 23, wherein the cleaning cycle additionally includes:
- supplying a predetermined amount of air to the cleaning reservoir after filling it at least partially with water, such that turbulence is created for at least partially dissolving the solid cleaning agent in the water to form the cleaning agent/water-mixture;
- measuring the conductivity of the cleaning agent/water-mixture in the fluid channel;
- comparing the measured conductivity against a predetermined value, and
- supplying a second predetermined amount of air to the cleaning reservoir if the measured conductivity is higher than the predetermined value.

25. The method according to claim 21, including flushing the fluid channel and the fluid outlet with air prior to executing the cleaning cycle.

26. The method according to claim 21, including executing at least one pre-flushing cycle before executing the cleaning cycle.

27. The method according to claim 21, including heating the cleaning agent during the circulation.

28. The method according to claim 22, further comprising heating the water prior to and during mixing the cleaning agent and the water in the cleaning reservoir.

29. The method according to claim 21, wherein the flushing cycle further includes:
- switching the valve assembly from the first state to the second state;
- opening the controllable water valve; and
- switching the valve assembly from the second state to the first state and closing the controllable water valve after filling the cleaning reservoir with water.

30. The method according to claim 21, wherein the flushing cycle includes:
- measuring the conductivity of a fluid in the fluid channel;
- comparing the measured conductivity against a threshold value; and
- executing an additional flushing cycle if the measured conductivity is lower than the threshold value;
- repeating the previous steps until the measured conductivity is higher than the threshold value.

* * * * *